United States Patent [19]
Kottmeier

[11] 3,895,906
[45] July 22, 1975

[54] HEATING PROCESS AND APPARATUS USING OXYGEN

[75] Inventor: Robert Roy Kottmeier, Hamilton, Canada

[73] Assignee: Canadian Liquid Air Ltd., Air Liquide Canada Ltée, Montreal, Canada

[22] Filed: Mar. 18, 1974

[21] Appl. No.: 452,350

Related U.S. Application Data

[63] Continuation-in-part of Ser. No. 342,397, March 19, 1973, abandoned.

[30] Foreign Application Priority Data

Mar. 24, 1972 United Kingdom................ 13937/72

[52] U.S. Cl. ................... 432/22; 432/105; 432/120
[51] Int. Cl. ............................................. F23l 15/00
[58] Field of Search ............ 432/19, 20, 21, 22, 23, 432/105, 120

[56] References Cited
UNITED STATES PATENTS

| | | | |
|---|---|---|---|
| 1,513,828 | 11/1924 | Kernohan et al. ..................... | 432/22 |
| 1,531,678 | 3/1925 | Millward............................... | 432/22 |
| 1,736,675 | 11/1929 | Steese................................... | 432/22 |
| 2,385,261 | 9/1945 | Crowe................................... | 432/22 |
| 3,074,707 | 1/1963 | Humphries et al. .................. | 432/22 |
| 3,488,700 | 1/1970 | Iken et al............................... | 432/22 |
| 3,620,514 | 11/1971 | Geiger, Jr............................... | 432/22 |

Primary Examiner—John J. Camby
Attorney, Agent, or Firm—Alan Swabey; Robert Mitchell

[57] ABSTRACT

A method of high energy release for surface heating a charge. The surface of the charge is provided by reacting a reactive material in or above the charge and simultaneously a streamline blanket of oxidizing gas is continuously directed from near a margin of the charge parallel to and hugging its surface. The reaction may take the form of a flame directed onto the charge, from above, through a burner. Alternatively, the charge may be a mixture of combustible and non-combustible material in which case the flame may be developed on the surface of the charge. Apparatus for surface heating includes a containing vessel for receiving a charge of material. An elongated manifold adjacent a margin of the vessel and extending a substantial distance across it not far from the surface of the charge provides means for directing a blanket of oxidizing gas substantially parallel to the surface of the charge. This may include spaced apart nozzles aimed parallel to the surface of the charge. The apparatus may also include at least one fuel injector above the manifold to provide a flame directed over the surface of the charge above the oxidizing gas.

21 Claims, 7 Drawing Figures

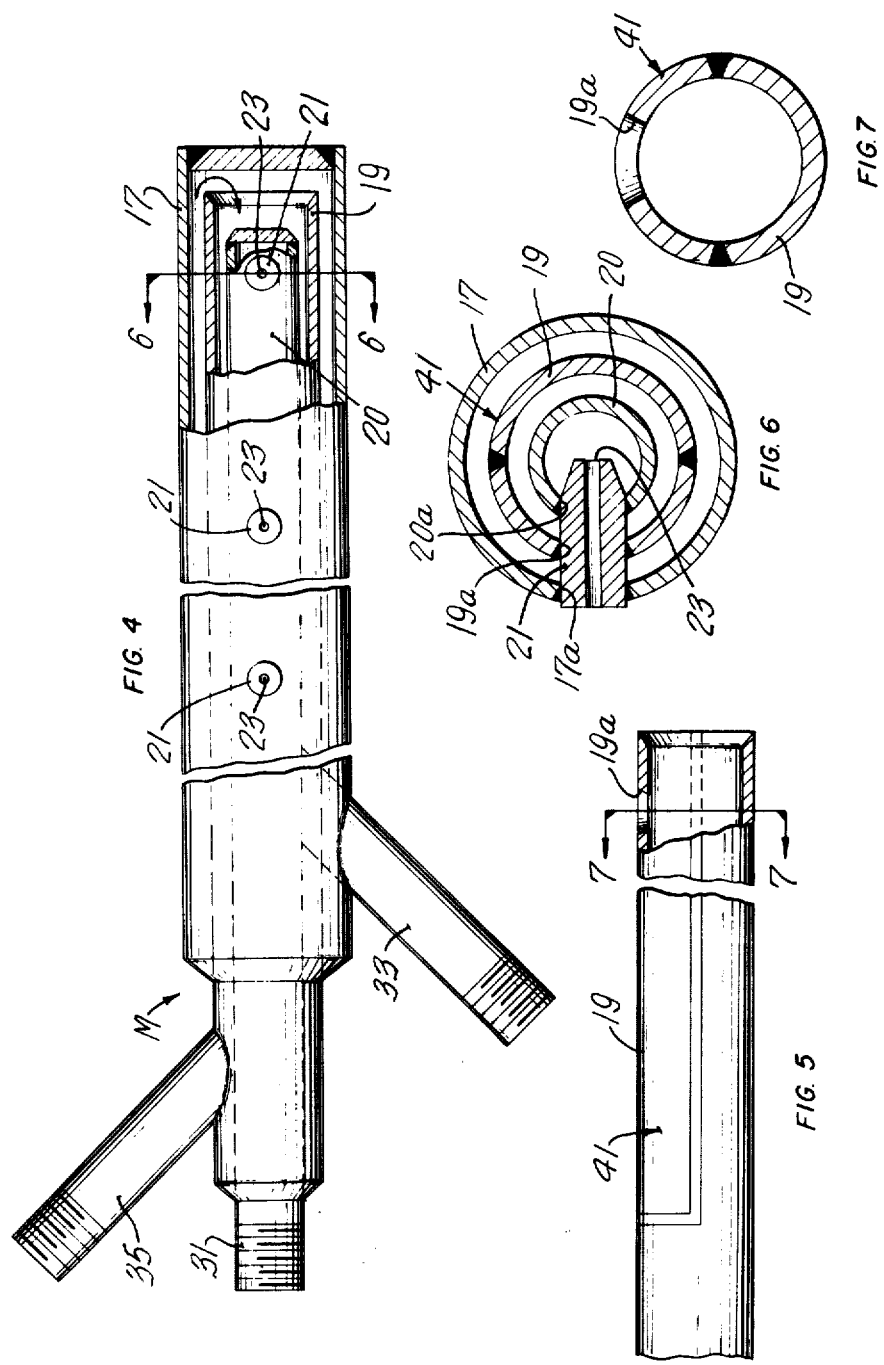

HEATING PROCESS AND APPARATUS USING OXYGEN

CROSS-REFERENCE TO RELATED APPLICATION

This application is a continuation-in-part of application Ser. No. 342,397, filed Mar. 19, 1973, now abandoned.

BACKGROUND OF THE INVENTION

1. Field of the Invention

This invention relates to a method of surface heating and fusion of a charge of material in an industrial furnace.

The type of apparatus to which the invention applies is an enclosed furnace in which flame and combustion products at high temperature are brought into direct contact with the surface of the material being processed. This is in contrast to other equipment like crucibles or kettles in which the heat is applied to the bottom of the containing vessel. The invention is especially applicable to reverberatory heating or refining equipment such as kilns, roasters, crucibles, openhearth furnaces, or glass tanks.

2. Description of the Prior Art

Conventional means of improving the effectiveness of surface heating have included:

a. Burners mounted in the roof of the furnace which provide a relatively concentrated combustion zone, so that the heat transfer is by direct impingement of flame and combustion products on the charge.

b. Burners mounted in the end or sides of the furnace which direct the flame and combustion products downwards and across the surface of the charge, supplemented by some heat transmitted by radiation from the furnace roof. Reinforcement of the individual flames has been achieved by directing a stream of oxygen into the flame zone, or at a divergent angle to the flame on to the surface of the charge.

SUMMARY OF THE INVENTION

This invention is concerned with a method by which heat from the flame and combustion products is concentrated in a high-temperature gas blanket on the surface of the charge in a refractory-lined vessel. Primary air for combustion is continuously supplied to the furnace vessel in conventional fashion at atmospheric pressure, or slightly higher, to provide combustion oxygen in the "global" atmosphere of the containment. A flame is continuously propagated in a continuously renewing global atmosphere of primary air, which is supplied to an inlet and proceeds at a relatively low velocity above the surface of the charge towards an outlet from which off-gases are continuously withdrawn. In the case of furnaces into which fuel is injected through a burner nozzle, the fuel ignites to form a flame which is projected over the surface of the charge. In cases where the fuel originates in the charge itself, the flame is provided by the ignition of the fuel gas which emanates from the charge. The oxygen in the global atmosphere feeds the flame and is continually renewed as it is consumed, while the combustion products pass out through the flues.

According to the invention, there is continuously projected between the global atmosphere and a major area of the surface of the charge and parallel to said surface an oxidizing gas to form a relatively high velocity incandescent blanket of reactive gases having a width several times its thickness. The respective supplies of primary air and oxidizing gas are controlled to maintain a substantial velocity difference between the global atmosphere and the blanket effective to provide a pressure gradient pressing the blanket towards the surface of the charge according to the Bernoulli principle.

In the case of a fuel-injection furnace, the oxidant gas is injected at high velocity under the flame, close to an parallel to the surface of the charge. In the case of a combustible charge, the oxidant blanket is maintained against the surface of the charge. In either case, the blanket of oxidant gas reacting with the fuel, is projected parallel to the surface of the charge below the general atmosphere of the furnace in the form of a high velocity flat jet between the charge and the general furnace atmosphere, and is maintained against the surface of the charge by the pressure gradient between the general atmosphere of the furnace and the flat, high-velocity jet.

The fact that the oxidant gas is injected at a velocity substantially higher than that of the flame or the general atmosphere in the furnace is important to the invention. Since the velocity of the oxidant gas is high, so is its kinetic energy (the $V^2/2g_c$ term in the Bernoulli Equation). Because of the high velocity in this thin flat jet, its static pressure is substantially below, i.e. several times lower than that of the general furnace atmosphere. Thus there is a positive pressure gradient between the general furnace atmosphere and that of the flat, high-velocity jet along the surface of the charge. This pressure gradient acts to maintain the oxidant jet as a thin blanket on top of the charge and prevents its being surrounded by the general furnace atmosphere or its diffusion into hot atmosphere.

The thickness of the flat blanket across the heat release area may vary from about 6 inches to about 1 foot. The ratio of thickness to width should be within the range from about 2 to about 8. The ratio of the initial velocity of the blanket to that of the global air in the furnace should be between about 50 and about 500.

One way of forming the blanket is by projecting the oxygen from a margin of the charge through a line of jets in the form of circular nozzles or slots. Higher gas speeds can be attained for example, by use of convergent/divergent nozzles to produce a flow at supersonic velocity. Preferably, the blanket is formed by supplying from about 1 to about 50%, preferably from about 5 to about 20% of the stoichiometric oxygen requirement of the fuel, at a velocity of at least 400 feet per second, up to Mach 1.

The invention also contemplates apparatus for carrying out the method. Such apparatus includes a receptacle for a charge of material to be heated and an elongated manifold adjacent to a margin of the receptacle, provided with means for jetting a blanket of oxidizing gas substantially parallel to the surface of the charge. A preferred arrangement includes a line of nozzles or slots. Desirably, the manifold is made up of a central plenum for oxidizing gas, protected by jacket means for the circulation of a cooling fluid. In this preferred structure each nozzle extends through openings in the plenum and jacket and emerges from the jacket in a jet-port. The inner end of each nozzle may project within the plenum to equalize the flow of gas to the respective nozzles. The invention also contemplates a preferred way of assembling the manifold.

BRIEF DESCRIPTION OF THE DRAWINGS

The invention will now be described in more detail by reference to the accompanying drawings, illustrating, by way of example, preferred expedients according to it, and in which:

FIG. 4 is a greatly enlarged transverse cross-section through the injector manifold of the furnace of FIG. 1;

FIG. 5 is a fragmentary side elevation showing the intermediate tube of the manifold with its coped out section;

FIG. 6 is a transverse cross-section along the line 6—6 of FIG. 5; and

FIG. 7 is a transverse cross-section similar to that of FIG. 3, through an alternative form of manifold.

DESCRIPTION OF THE PREFERRED EMBODIMENTS

Figure 1:
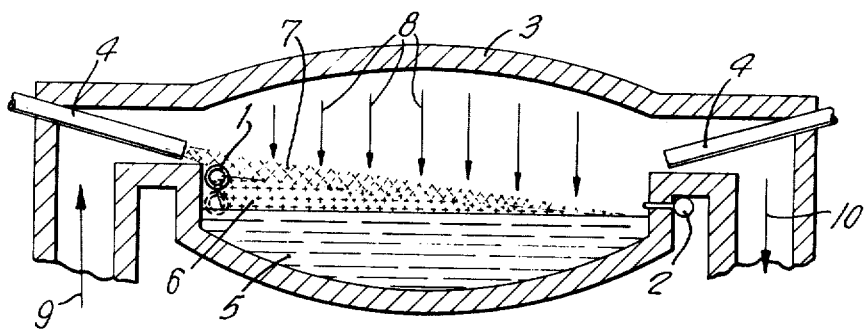
FIG. 1 is a schematic longitudinal vertical cross-section through an open hearth furnace equipped to carry out the process of the invention.

FIG. 1 shows a typical reverberatory furnace 3 of the reversing or regenerative type, for example, with a charge 5 of scrap, pig iron fluxes and alloy additions. This may be a regenerative furnace fired from both ends, or a single end firing furnace. Typical fuel burners 4 are shown on each end, emitting a fuel-propagated flame. The air flow 9 for the global air in the furnace, through the checkers, is typical of a regenerative type of reverberatory furnace. The exit of the spent gases 10 goes to the regenerator and stack. Oxidant material, in this example tonnage oxygen of commercial grade is projected from a manifold 1 at ambient temperature in a jet or blanket 6 with a plate-like geometry providing a volume of high velocity and incandescence close to the surface of the charge 5. The manifold 1 is fed under pressure from a source of tonnage oxygen. The higher pressure and slower portion 7 of the flame is above the area 6. Arrows 8 indicate the downward thrust of the static pressure of the furnace atmosphere. Means (not shown) is provided for controlling the supply of primary or global air through the inlet 9. Means (not shown) is also provided for controlling the supply of the oxidizing gas to the manifold 1. Means (not shown) is also provided to control the flow of fuel to the nozzle 4. The control of the respective supplies of primary air, fuel and oxidizing gas are coordinated to maintain a substantial velocity difference between the blanket and the global atmosphere effective to provide a pressure gradient pressing the blanket towards the surface of the charge according to the Bernoulli principle.

The high velocity of the flat jet 6 is greater than that of the global combustion air, by virtue of its initial kinetic energy and faster reaction rate, due to more rapid oxidation by the richer oxidant. The airfoil effect created is similar to the Bernoulli effect, well known in aerodynamics and this is what causes the jet blanket 6 and the flame 7 to be pushed against the charge by the higher pressure of the surrounding atmosphere 8.

The manifold M, supplying the oxidant material, has been shown inside the furnace as 1. But, in certain types of the furnaces the manifold may be outside, with ports or slots coming through the refractory or heat resistant wall of the furnace, for example as at 2.

In starting the use of oxygen, the furnace is operated in the normal way. For example, in a glass tank, the fuel is supplied at the normal flow rate for conventional operation. Then, oxidant gas is injected, in the manner of the invention, and the fuel cut back as determined by the glass temperature, and the oxygen-fuel ratio adjusted to within the limits stated. Once the criteria are established, the fuel and oxygen are cut in, at the same time.

While one horizontal manifold has been shown, an auxiliary manifold may be employed, as for example shown in dotted lines in FIG. 1. This could be used to overcome physical limitations of the furnace or to provide dual pressure to ensure the maintenance of the flat, high-velocity, jet.

Suitable nozzle openings, for example, may range in diameter from 0.062 inches to 0.500 inches (from about 1/16 to about ½ inch) for circular nozzles or the same range thickness for slots. For the glass furnace of the example below the orifices are 0.092 (about 3/32) of an inch diameter.

The nozzle bore should be designed in such a way as to maintain the dimensional stability of the jets. This is achieved by having a desirable diameter to bore-length ratio and/or convergent/divergent configuration. The water-cooled manifold may be insulated with refractory to avoid excess of thermal losses due to the water cooling.

The nozzle orifices may be circular, or in the form of slots of other shapes capable of providing the flat, high-velocity jet. The nozzles toward the side of the manifold may toe slightly inward to avoid overheating near the refractory wall of the furnace and other such nozzles may toe outward to increase or at lest avoid restricting the horizontal surface area of the blanket. The nozzles should be substantially parallel to the surface of the charge. The orifices or slots should be in a position to give the best jet configuration. The specific nature of the nozzles will depend on the particular furnace on which they are installed. Factors which require variation of the blanket and so of the means for spreading it, are the length and breadth of the furnace and the particular area of energy release desired. If the walls are relatively close to the flame area, for example, the outer jets may toe in so as not to cause over-heating of the refractory. On the other hand, if the walls are spaced outwardly from the actual area of high heat release, the outer jets may toe outwardly so as to broaden the jet. Blowing may be from the end or ends and/or from the side or sides of the furnace.

The nozzles should have a total cumulative gas delivery capacity of no less than 1 and no greater than 50% of the stoichiometric amount of oxygen required to burn the fuel; a preferred range is between 5 to 50% of the stoichiometric amount. The exact total flow would be selected within these ranges, depending on features of furnace geometry such as the location of the main burners, and the location of the exit flues. The jet should be in a position to work mainly in the reaction zone and the velocity of the oxidant gas should be adjusted to cover this zone. The term "fluid oxidant" has been used to define a fluid with an oxidizing power equivalent at least to that of an equal volume mixture of oxygen and nitrogen. Preferably commercial tonnage oxygen is employed.

The blanket is a flat, high-velocity jet of oxidant fluid in close proximity to the surface of the charge and in reaction with the fuel gases. "Flat" means having a thickness from 6 inches to 1 foot across the area desired for heat release and being at least 3 times as wide as it is thick. The blanket should be at least the width of the flame. For example, if a single fuel jet is employed in an open hearth with an oil flame 3 feet in diameter measured 10 feet from the nozzle, the blanket would be at least about 3 feet wide at the point of measurement. The blanket should have a width at least twice and preferably several times its thickness.

Where a plurality of jet-forming nozzles are used to form the blanket, each nozzle preferably runs from about 1/16 to about ½ inch in internal diameter, but there is an instant expansion as the gas leaves the nozzle and leaving a ½ inch nozzle, the jet, one inch or so out from the nozzle, would have a thickness in the neighbourhood of 1 inch. The jets merge in the lateral direction to form the blanket. Where the nozzle is in the form of a slot, ideally the slot would be the width of the surface to be covered. For structural reasons the slot may be interrupted by supporting members.

Since the maintenance of a stable, flat, high-velocity jet is a direct outcome of the Bernoulli principle, the design of the nozzle or slot array will depend upon the geometry and the dimensions of the blanket required. Within the jet itself, the Reynold's Number of the gas will be very high indeed, and the turbulence will have high intensity and low scale. The nozzle or jet array will be designed in accordance with the prticular furnace requirement, so that the pressure gradient between the slower-moving general furnace atmosphere and the flat jet is sufficient to maintain a stable oxidant blanket of appropriate dimensions.

Another beneficial result of the invention is that higher fuel and oxidant rates can be used than in conventional furnaces, with consequently faster heating rates; at the same time, refractory deterioration is reduced.

Figure 2:
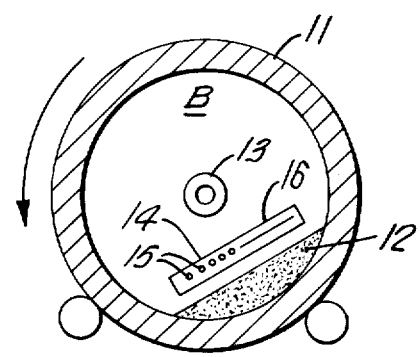
FIG. 2 is a transverse vertical cross-section through another form of apparatus in which a process, according to the invention, may be carried out.
Figure 3:
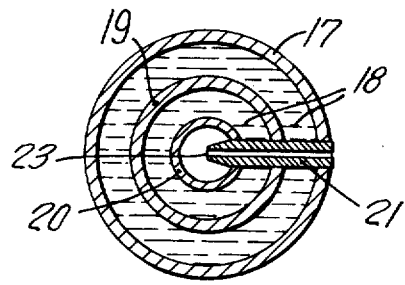
FIG. 3 is a greatly enlarged front elevation partly in section, of the injector manifold of FIG. 1.

FIG. 2 shows another type of furnace in which the applicant's method of heating is used. The shell 11 of a kiln, rotating, in this example, anti-clockwise, is shown containing a charge, for example, of a greater substance which is being calcined and/or fused. The cross-section is looking in the direction of the stationary firing end bulkhead B. The burden 12 of the substance being treated, which in this case may be a granular substance containing a mixture of combustible with non-combustible or partially combustible material, is at an angle of repose because of the rotation of kiln as shown by the arrow. The usual burner 13 position is on the stationary bulkhead B at the end of the kiln. The manifold 14 is at substantially the same angle as the surface of the substance in the kiln to give the surface hugging effect, irrespective of gravity. The manifold supplying the oxidant material can be slotted as at 16 or can have a multiplicity of ports or orifices 15 spread across its face substantially parallel to the substance being treated, so as to provide a film or blanket of the oxidant fluid which hugs the surface of the charge 12.

The blanket should be laid parallel to the charge, even in the case where the burden or melt is tilted, i.e. in a rotary kiln, to prevent rebound effect common in other types of burners. The manifold M is tilted to keep it parallel longitudinally in elevation to the burden or melt. Terminal jets are angled inward for example from 2° to 9° to control the flame goemetry in plan to keep it away from the sidewall and refractory. The process provides for a wide distribution of release of energy in an even pattern. This reduces bath turbulence. The flue gasses will be cooler than with conventional firing.

FIGS. 3 to 7 show a preferred manifold M. 17 is a tubular outer case. 18 represents the in and out coolant material, in this case, water. 19 shows a concentric tubular baffle to ensure positive circulation of the coolant material. 20 indicates a concentric cylindrical pipe carrying the oxidant substance, in this case, tonnage oxygen, and 21 represents a nozzle with a round or slotted orifice 23.

A pipe 31 enters the manifold M and leads to the central pipe 20 to carry the oxidant substance. A pipe 33 for incoming cooling fluid leads to the space between the tubes 17 and 19. An outlet pipe 35 for outgoing cooling fluid leads from the space between the pipes 19 and 20.

The method of assembly of the manifold is also a preferred aspect of the invention. Metal tubes 17, 19 and 20 of graduated size are provided with spaced apart nozzle receiving openings 17a, 19a and 20a (FIG. 6), respectively. First, the nozzles 23 are assembled to the tube 20 by inserting them into openings 20a and welding them to the surrounding area of the tube. A section 41 of the tube 19 containing the openings 19a is cut out. The assembly of the tube 20 with the nozzles 23 is then placed within the tube 19, with the part 41 removed. The part 41 is then replaced with the nozzles 23 entering the openings 19a. The part 41 is welded back in place and the nozzles 23 welded to the tube 19 about the openings 19a.

The assembly, made up of the tubes 19 and 20 and the nozzles 23, is then placed within the tube 17, with the openings 17a receiving the nozzles 23. By first placing the assembly off-center, within the tube 17, it is possible to insert the assembly within the tube 17 and then to center the tube 19 within the tube 17 by pushing the nozzles 23 through the openings 17a to the required extent. The nozzles 23 are then welded to the tube 17 about the openings 17a to complete the assembly.

Appropriate connections between the pipes 31, 33 and 35 to the oxygen supply and the cooling fluid supply, and return, are made and the manifold is held in place within the furnace by appropriate means, which is not thought necessary to illustrate. The manifold is mounted so that the nozzles 23 are directed substantially parallel to the surface of the charge.

The invention also contemplates an elongated bar or manifold supplying the oxidant material, positioned substantially at right angles to the direction of the flame so that a film or blanket is spread over substantially the whole bath area rather than a single jet of enriched oxidant material in the primary air or in the furnace itself. The invention also contemplates a manifold that can be raised or tilted as for example in the case of a rotary kiln, substantially parallel to the substance being thermally treated, in order to get the blanket of the incandescent film parallel and close to the material regardless of position and gravity, such as the inherent angle of repose when the kiln is rotating.

VARIABLES

As the oxidizing gas, there is used preferably commercially pure oxygen, i.e. at least 99.5% oxygen, but oxidizing gas which contains more than 85% oxygen may be used as can oxidizing gas, for example oxygen enriched air containing down to 50% oxygen. Nitrous oxide, fluorine or chlorine may also be used as oxidizing gases where a chemical reaction employing such gases is required.

The charge may vary. A preferred application is to melt glass, which is usually fed in solid granular form. Another application is in the treatment of ores which are also fed in granular form. Still another use is in treating scrap or hot metal in the open hearth.

EXAMPLE

The following is an example of preferred specific operations, according to the invention.

A regenerative reverberatory reversing furnace was employed to melt and refine glass using 99.5% oxygen as the blanket forming gas. The furnace was approximately 11 feet across and 15 feet long. On each of the long sides there were two ports each 3 feet wide by 2 feet high and spaced approximately equally along the side of the furnace. For each reversal two ports were used simultaneously on one side. The periods of reversal were approximately 20 minutes. Burners for natural gas were located within the ports. Preheates air also entered these ports. Spaced in each port, at the bottom, as far forward as possible, was a manifold or jet bar according to the invention.

Melting was carried on continuously around the clock. It is estimated that the resisdence time of any particle of glass was about 18 hours although this would vary with the rate of draw. The level of the glass melt was fairly constant with its surface about 6 inches from the bottom of the manifold. The jet bars had equally spaced apart holes, at approximately 8 inch centers, pointing into the furnace. There were 6 horizontal jets to one side, 3 to each port.

The normal path of the flame was across the bath into the adjacent port, where it entered a regenerative checker system to heat the air for the next reversal. The film or streamline thickness was observed to be about 4 to 6 inches. The air preheat was from approximately 1800°F. to 2200°F. The ports were 3 feet wide and there were two indicating that the span of the effectve manifold area was 6 feet wide at the start. The flame spread slightly across and then pulled in again into the port on the opposite side after the momentum of the streamline was exhausted. The jets were arranged approximately 10 inches from each side of the portal to reduce the chances of erosion of the side brick in the portal.

11,440 SCFH of natural gas were used during normal operations, without the help of oxygen, supplied by the special manifold to melt the charge continuously. When the manifold oxygen was used, the manifold oxygen, in relation to total air, was approximately 1 or roughly 5% of the stoichiometric requirement. As the melt proceeded it was possible to cut the gas down to 6800 SCF per hour, maintaining the same flow of oxygen, namely 20 SCFM or 1200 SCFH which then worked out to 1.875% of the total air of 9.3% of the stoichiometric oxygen requirement. No melt temperature was lost, there being an increase, if anything.

The regenerator was cooler than normal at the high end of the swing (or time before reversal) and about the normal temperature at the low end (or time at end of reversal). Roof temperatures were observed to be approximately 150° to 200°F. cooler than normal with no sacrifice in melting rate. The exit velocity of the jets was approximately 800feet per second. Each jet provided approximately 200 SCFM of oxygen per hour.

The table following shows results in terms of measurements of a number of factors in the melt described.

|  |  | Normal Nitrous Oxygen | With Tonnage Oxygen Blanket |
| --- | --- | --- | --- |
| Time |  |  | 8:10 |
| Fuel consumption (natural gas) | SCFH | 11,440 | 6,800 |
| Air flow | SCFH | 100,000 | 64,000 |
| O₂ flow | SCFH | 0 | 1,200 |
| Flame length |  | ¾ of checkers | 2 ft. into checker |
| Flame geometry |  | Long sweep up | low down |
| Crown temperature | °F. | 2738 | 2600 |
| Bridge wall temp. | °F. | 2718 | 2625 |
| Tank pull | Tons/day | 15 | 15 |
| Tank pressure | In H₂O | 0.025 | 0.025 |
| Batch pattern |  | 1/5 | 1/7 |
| Refiner crown temp. | °F. | 2360 | 2355 |
| R.H. checker | °F. | 1805/2280 | 1850/2160 |
| L.H. checker | °F. | 1920/2300 | 1970/2200 |

Referring to the Table, column 1 gives the results of a melt according to conventional practice with a natural gas flame. Column 2 gives comparative results using the present invention as described in the Example.

The Table shows that, following the present invention, the fuel consumption is considerably reduced, with a corresponding reduction in air flow. In the conventional run, the flame extended three-quarters of the way into the checkers. Using the process of the invention, the flame only extended two feet into the checkers (i.e. was barely visible in the checkers). The flame, using the conventional process was a long upsweeping voluminous flame. The flame of the invention was a comparatively short low flame which hugged the surface of the charge. The temperature at the roof of the furnace was considerably reduced. The bridge wall temperature was also reduced by 100°F. This is significant, since according to normal practice, the temperatures are only in the neighbourhood of 200°F. from destruction.

The production of the runs was 18 tons a day. The tank pressure in inches of water remained the same at 0.025. The batch pattern of the invention was changed in that the charge material became completely molten at 1/7 the distance into the furnace rather than 1/5, with the conventional process. The refiner crown temperature, i.e. the part of the roof where the molten glass is held for refining, was substantially the same. The high end of the checker temperature range, using the process of the invention, was somewhat lower than the same factor using the prior art. This is a significant difference since the checkers can disintegrate and the temperature, according to prior art practice, is close to disintegration temperature.

It is also to be noted that the cold part of the checker was somewhat higher using the process of the invention. This means that there was a better preheating effect and not such a gib swing between hot and cold, as with the conventional process.

At all times, using the process of the invention, the quality of the glass produced was as good or better than by conventional practice. The measurements were made by the amount of cullet produced in the packing line.

The method of the invention provides for heating the substance being treated and avoiding other parts of the heating device as in the case of a rotary kiln, in which excessive heating of the shell causes material to stick (commonly called "ringing") resulting in extensive cleaning operations. This condition will be reduced through the controlled flame geometry of the invention.

A fast efficient method of surface heating is provided which will reduce attrition or loss of alloy or the like by means of lowered residence time by efficient heating and the ability of the parallel blanket of oxidant to react preferentially with the fuel rather than with the charge. This fast and efficient method of thermal treatment can be used advantageously in the direct reduction of ores or winning the required elements from them.

The invention also makes it possible to employ less fuel to achieve the same heating effect. This results from the efficient release of energy brought about by the combined introduction of the fuel in a stream, coupled with the introduction of the oxidizing gas in a streamline. For example, the savings of fuel can range upwards from 20% and in certain cases up to 40% or more, depending on the particular type and size of furnce and the heating task involved. Conversely, the total amount of fuel that can be injected into the furnace is increased with the consequent increase in throughput, because the reaction takes place near the surface of the charge and does not diffuse throughout the furnace as in the case of prior art processes using oxygen with an unbounded flame, the geometry of which is not aerodynamically controlled.

The versatility is surprising in the ability to increase or decrease the fuel with little or no loss of the airfoil effect, provided the direction of the jet is parallel to the charge. The jet bars, manifolds, or multi-jets in the side of the furnace or the like should be designed to suit each use. Their placement and design would have to satisfy the operator's requirements as to where he wants the high energy release on his melt or burden caused by the airfoil effect. Setting the "sight" or reactive zone is a matter of designing jet coverage to suit the specific operation and, at the same time meet the requirements of Bernoulli's equation.

I claim:

1. A method of heating a charge in a furnace having means forming an enclosed chamber disposed between a primary air and fuel inlet and an off-gas outlet, said chamber including means for containing a charge presenting an extensive surface to be heated, said chamber defining a surrounding enclosure containing a global atmosphere of primary air and fuel above the charge, in which method a flame is continuously propagated in said global atmosphere which is continuously renewed by primary air supplied to said primary air and fuel inlet and proceeds at a relatively low velocity above the surface of the charge towards said off-gas outlet from which off-gases are continuously withdran, comprising, the steps of:

continuously projecting over a substantial width of the chamber, below said primary air and fuel inlet between said global atmosphere and immediately over a major area of the surface of the charge, substantially parallel to said surface, an oxidizing gas containing at least 50% oxygen and thereby forming a continuously propagated, relatively high-velocity incandescent blanket of reacting gases having a width several times its thickness moving at a substantially greater velocity than that of said global atmosphere, and controlling the respective supplies of primary air and oxidizing gas and maintaining a substantial velocity difference between the incandescent blanket and the global atmosphere forming a pressure gradient pressing the incandescent blanket against the surface of the charge.

2. A method, as defined in claim 1, comprising projecting the oxidizing gas at a jet velocity of at least 400 feet per second.

3. The method, as defined in claim 1, comprising maintaining the ratio of the velocity of the incandescent blanket to that of the global air between 50 and 500.

4. A method, as defined in claim 1, comprising projecting the oxidizing gas at a jet velocity of at least 400 feet per second and maintaining the ratio of the velocity of the blanket to that of the global air between 50 and 500.

5. A method, as defined in claim 1, comprising propagating the flame by burning a combustible component of the charge.

6. A method, as defined in claim 2, comprising propagating the flame by burning a combustible component of the charge.

7. A method, as defined in claim 3, comprising propagating the flame by burning a combustible component of the charge.

8. A method, as defined by claim 4, comprising propagating the flame by burning a combustible component of the charge.

9. A method, as defined in claim 1, comprising propagating the flame by injecting a fuel into the global atmosphere above the incandescent blanket.

10. A method, as defined in claim 2, comprising propogating the flame by injecting fuel into the global atmosphere above the incandescent blanket.

11. A method, as deined in claim 3, comprising propagating by injecting a fuel into the global atmosphere above the incandescent blanket.

12. A method, as defined in claim 4, comprising propagating the flame by injecting a fuel into the global atmosphere above the incandescent blanket.

13. A method, as defined in claim 1, comprising projecting the oxidizing gas from an array of spaced nozzles so that plural gas streams merge and form the incandescent blanket.

14. A method, as defined in claim 13, comprising directing at least one jet at a side of the array inwards toward the center of the incandescent blanket and controlling the flame geometry.

15. A method, as defined in claim 1, comprising projecting the oxidizing gas from a nozzle having a substantially continuous elongated slot from which the gas stream emerges and forming the incandescent blanket.

16. A method, as defined in claim 1, comprising forming the incandescent blanket by projecting the oxidizing gas through an array of nozzles and providing each nozzle with a circular outlet orifice.

17. A method, as defined in claim 1, comprising maintaining the incandescent blanket so that it has an initial width at least 3 times as wide as it is thick and from 6 inches to 1 foot thick.

18. In an apparatus for heating a charge in a furnace, comprising in combination, a furnace having means forming an enclosed chamber disposed between a primary air and fuel inlet and an off-gas outlet, said chamber including means for containing a charge presenting an extensive surface between said inlet and outlet, said chamber including means defining a surrounding enclosure for containing a global atmosphere of primary air above said means for containing a charge, means directed from the inlet towards said outlet for continuously propagating said global atmosphere and renewing it with primary air at a relatively low velocity, the improvement in which:

said furnace includes means below said inlet for continuously projecting an oxidizing gas containing at least 50% oxygen between the global atmosphere and the charge, toward said off-gas outlet and across a major portion of the chamber and parallel to the charge for forming an incandescent blanket having a relatively high velocity, as compared with the global atmosphere, comprising reacting gases having a width several times it thickness; and means for controlling the respective supplies if primary air and oxidizing gas for forming a pressure gradient between the global atmosphere and the incandescent blanket whereby the blanket is pressed toward the surface of the charge.

19. An apparatus, as defined in claim 18, in which the means for projecting the oxidizing gas includes an array of spaced apaart nozzles from which gas streams merge to form the blanket.

20. An apparatus, as defined in claim 18, in which the means for projecting the oxidizing gas includes a nozzle having a substantially continuous elongated slot from which the gas stream emerges to form the blanket.

21. An apparatus, as defined in claim 18, in which at least one nozzle flanking of the array is directed inward towards the center of the chamber to control the flame geometry.

* * * * *